United States Patent [19]

Schneider et al.

[11] Patent Number: 4,615,417
[45] Date of Patent: Oct. 7, 1986

[54] MECHANICALLY OPERATED SLIDING SADDLE DISC BRAKE

[75] Inventors: Wilhelm Schneider; Norbert Jobke, both of Mannheim; Bernd Rupprecht, Edingen-Neckarhausen, all of Fed. Rep. of Germany

[73] Assignee: Deutsche Perrot-Bremse GmbH, Mannheim, Fed. Rep. of Germany

[21] Appl. No.: 766,398

[22] Filed: Aug. 16, 1985

[30] Foreign Application Priority Data

Aug. 29, 1984 [DE] Fed. Rep. of Germany ....... 3431773

[51] Int. Cl.⁴ ............................................. F16D 65/02
[52] U.S. Cl. .................... 188/72.8; 188/73.1; 188/73.38; 188/73.39; 188/250 G
[58] Field of Search .................. 188/72.7, 72.8, 72.9, 188/73.1–73.2, 72.6, 72.4, 72.3, 72.5, 370, 216, 71.1, 234, 71.5, 71.8–71.9, 73.31, 73.35, 73.36, 73.37, 73.38, 73.39, 73.44, 73.45, 106 F, 106 R, 196 BA, 250, 205, 206

[56] References Cited

U.S. PATENT DOCUMENTS

| 3,432,007 | 3/1969 | Hillegass | 188/250 B X |
| 3,693,765 | 9/1972 | Hikida et al. | 188/205 A X |
| 3,966,025 | 6/1976 | Newstead | 188/72.5 |
| 3,974,897 | 8/1976 | Pringle | 188/72.8 X |
| 4,055,237 | 10/1977 | Numazawa et al. | 188/73.35 |
| 4,117,912 | 10/1978 | Ruppe, Jr. | 188/216 |
| 4,200,173 | 4/1980 | Evans et al. | 188/250 B X |
| 4,223,764 | 9/1980 | Flotow | 188/72.3 X |
| 4,470,483 | 9/1984 | Holtz | 188/250 B X |
| 4,487,295 | 12/1984 | Mitchell | 188/72.8 X |
| 4,548,300 | 10/1985 | Sheill et al. | 188/250 B X |

FOREIGN PATENT DOCUMENTS 2659613 7/1978 Fed. Rep. of Germany ..... 188/72.8

Primary Examiner—Douglas C. Butler
Attorney, Agent, or Firm—Holman & Stern

[57] ABSTRACT

A mechanically operated sliding saddle disc brake has a fixedly positioned brake carrier 1, a brake saddle 2 mounted in the brake carrier and slidably displaceable parallel to the rotational axis of the wheel to be braked, with two shanks 2', 2" which straddle a brake disc which is rotationally fast with the wheel, a piston 14 mounted in the first brake saddle shank 2' slidably displaceable parallel to the rotational axis of the wheel and connected to a pressure plate 12, a first brake lining carrier 4 positioned on pressure plate 12 which carries a brake lining 4' which can be brought into engagement on one side of the brake disc, a mechanically operated expansion mechanism supported on piston 14 and on the first brake saddle shank 2', a second brake lining carrier 3 positioned on second brake saddle shank 2" which carries brake lining 3' which can be brought into engagement with the other side of the brake disc, and guides 11, 11' positioned on brake carrier 1 for guiding and supporting the two brake lining carriers 3, 4. To ensure parallel positioning of the brake lining carriers to the brake disc and thus full surface engagement of the two brake linings on the brake disc both when the brake is inoperative and when it is operative, pressure plate 12 is connected to piston 14 via a projection 13 which allows rocking movements of pressure plate 12, pressure plate 12 is clamped to piston 14 via a compression spring screw bolt combination 15, second brake lining carrier 3 is supported on second brake saddle shank 2" by at least one cylindrical projection 6 having a crest line running tangentially to the brake disc and through the center of braking area of second brake lining 3', second brake lining carrier 3 is supported on abutment 7 near the free end of second brake saddle shank 2", and second brake lining carrier 3 is clamped to the second brake saddle shank 2" by helical springs 8.

9 Claims, 3 Drawing Figures

MECHANICALLY OPERATED SLIDING SADDLE DISC BRAKE

BACKGROUND OF THE INVENTION

1. Field of the Invention

The invention relates to a mechanically operated sliding saddle disc brake comprising a fixedly positioned brake carrier, a brake saddle mounted in the brake carrier and slidably displaceable parallel to the rotational axis of the wheel to be braked, with two shanks which straddle a brake disc which is rotationally fast with the wheel, a piston mounted in the first brake saddle shank slidably displaceable parallel to the rotational axis of the wheel, which piston is connected to a pressure plate, a first brake lining carrier positioned on the pressure plate which carries a brake lining to be brought into engagement on the one side of the brake disc, a mechanically operated expansion mechanism supported on the piston and on the first brake saddle shank, a second brake lining carrier positioned on the second brake saddle shank which carries a brake lining which can be brought into engagement with the other side of the brake disc, and guides positioned on the brake carrier for guiding and supporting the two brake lining carriers.

2. Description of the Prior Art

If in such a known sliding saddle disc brake the expansion mechanism is operated, then first the piston is displaced in the first brake saddle shank, until the first brake lining, which is positioned on the first brake lining carrier connected to the piston, engages the brake disc. Due to the reaction forces exerted by the expansion mechanism, the whole of the brake saddle is then displaced in the opposite direction relative to the brake carrier, until the brake lining on the second brake lining carrier connected with the second brake saddle shank engages the opposite side of the brake disc. Due to the elastic deformability of the brake saddle this produces a slightly skew position of the second brake saddle shank, which results in irregular wear of the second brake lining in relation to its whole surface. As can easily be seen, due to the deformation or skew positioning respectively of the second brake saddle shank the region of the second brake lining closer to the rotational axis suffers less wear than the more remote region.

The wear situation for the first brake lining carrier however is different from that for the second brake lining carrier. Here the situation of forces acting, comprising the moment of the braking force at the surface of the first brake lining and the distance to abutment on the pressure plate, causes one sided lining wear on the running-in side of the brake disc.

BRIEF SUMMARY OF THE INVENTION

The invention has as an object the creation of a sliding saddle disc brake of the above generic type, in which means are provided ensuring a parallel positioning of the brake lining carriers to the brake disc both when the brake is inoperative and when it is operative.

According to the invention this object is solved by the combination of the following characteristics:
- (a) that the pressure plate is connected to the piston via a locating boss, which allows rocking movements of the pressure plate,
- (b) that the pressure plate is clamped to the piston via a compression spring screw bolt combination,
- (c) that the second brake lining carrier is supported on the second brake saddle shank by at least one cylindrical projection, whereby the crest line of the cylindrical projection(s) runs tangentially to the brake disc and through the center of area of the second brake lining,
- (d) that the second brake lining carrier is supported on an abutment near the free end of the second brake saddle shank, and
- (e) that the second brake lining carrier is clamped to the second brake saddle shank by helical springs.

These constructional measures allow the pressure plate to execute a rocking movement relative to the first brake saddle shank. Thereby on operation of the brake evasive movement of the pressure plate and of the first brake lining carrier connected to it is possible, so that approximately even wear of the first brake lining is ensured. It as a result of brake operation the brake saddle is deformed, then the second brake lining carrier can likewise carry out evasive action, as it can twist relative to the second brake saddle shank about the crest line of the cylindrical projection(s). This rocking movement ensures that the brake lining on the second brake lining carrier also takes up a position parallel to the brake disc and engages it over its full surface.

In the inoperative state of the brake the compression spring screw bolt combination causes the pressure plate and the first brake lining carrier connected thereto to be orientated parallel to the brake disc. The second brake lining carrier is similarly held in a position parallel to the brake disc, because it is supported against an abutment near the free end of the second brake saddle shank by the bias force of the helical springs acting on it.

From a constructional point of view it has proved aadvantageous, that the cylindrical projection(s) is (are) arranged on the second brake lining carrier and that the corresponding abutment surfaces of the second brake saddle shank are flat.

With a view to having particularly even wear of the first brake lining it has proved suitable, that the pressure plate has a recess in the middle region of its abutment surface on the first brake lining carrier.

To recreate the necessary clearance gap in the inoperative position of the brake, provision is made for the first brake lining carrier to be clamped to the pressure plate via helical springs.

There is provided in a particularly space saving embodiment of the compression spring screw bolt combination, that the latter comprises, set into a bore of the pressure plate and screwed into a threaded bore of the piston, a hexagonal socket-head screw and a compression spring, which spring is supported on the head of the hexagonal socket-head screw and on the floor of the bore in the pressure plate.

BRIEF DESCRIPTION OF THE DRAWINGS

Further details, advantages and characteristics of the invention can be seen from the following description with reference to the accompanying drawing.

DETAILED DESCRIPTION

Figure 1:
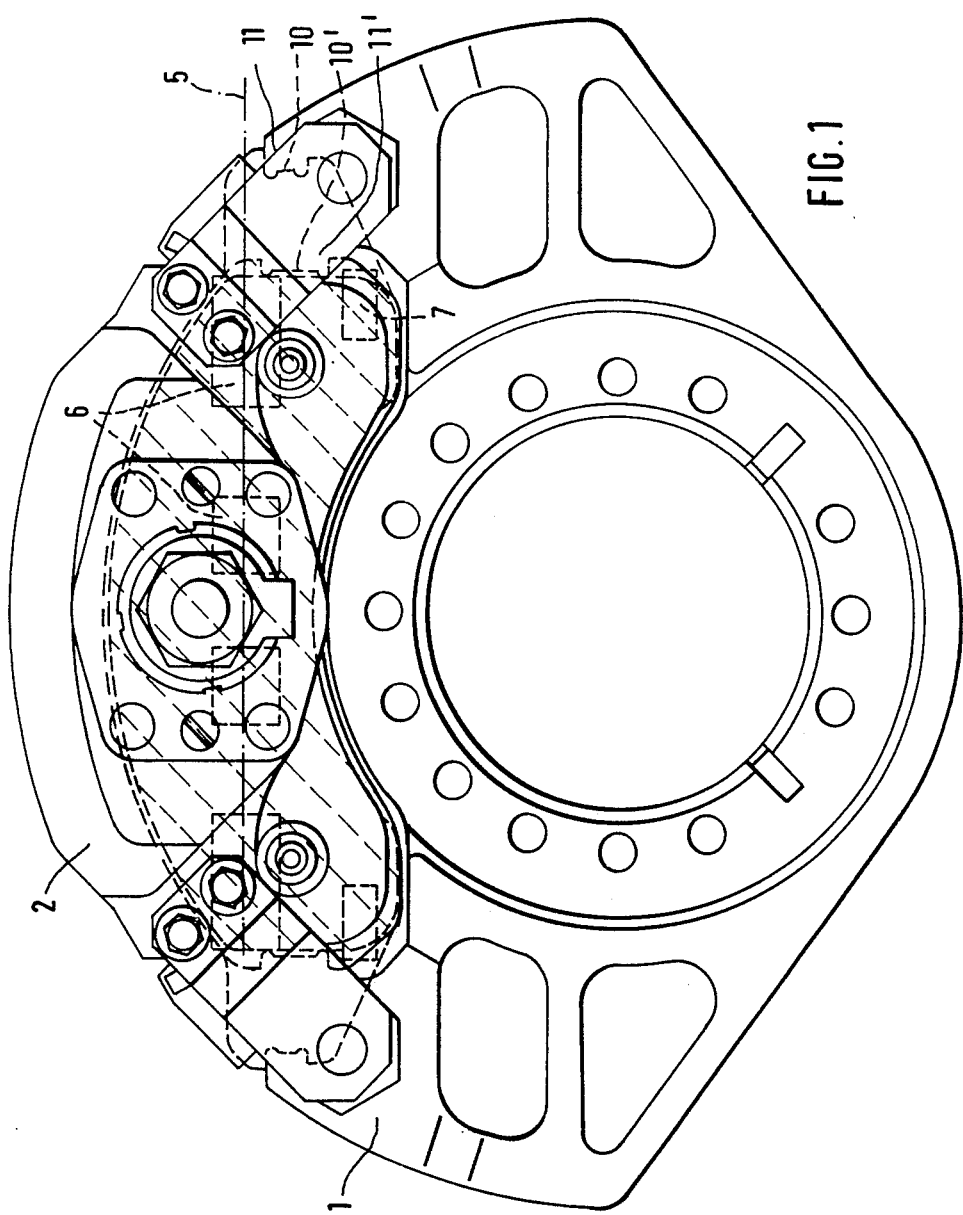
FIG. 1 is a front elevational view of a sliding saddle disc brake in accordance with the invention.

The mechanically operated sliding saddle disc brake shown in the drawing comprises a brake carrier 1, fixedly positioned relative to the (not illustrated) brake disc, and a brake saddle mounted in the brake carrier and slidably displaceable parallel to the rotational axis of the brake disc. The brake saddle 2 has two shanks 2' and 2" straddling the brake disc. In the first shank 2' of brake saddle 2 there is mounted a piston 14 displaceable parallel to the rotational axis of the disc brake. A mechanically operated expansion mechanism serves to displace the piston 14, which mechanism is supported on the piston 14 and the first brake saddle shank 2'. As the construction of the expansion mechanism is not part of the subject matter of the present invention, it need not be explained in any more detail here. It is however pointed out, that such an expansion mechanism is described with all details in the West German Patent application No. P 31 72 799.5.

On the two sides of the brake disc there are situated a first and a second brake lining carrier 4,3, which on their respective sides facing the brake disc bear brake linings 4', 3' for engaging the latter. The second brake lining carrier 3 is formed on its rear side away from its brake lining 3' with four cylindrically curved projections 6, whose crest line runs tangential to the brake disc and passes through the center of area of the second brake lining 3'. The projections 6 are components of a notional cylinder, whose axis is parallel to the center of gravity line 5 of the surface of the brake lining. On a line parallel to this center of gravity line 5, which line is at a shorter distance from the rotational axis of the brake disc, the second brake lining carrier 3 has two abutments 7. As can be seen in particular from FIG. 2, the second brake lining carrier 3 is so biased by two helical springs 8, that it abuts with its projections 6 and abutments 7 on the second brake saddle shank 2". The second brake lining carrier 3 is provided on both sides with a groove 10, into which a projection 11 engages which serves for guidance and is parallel to the rotational axis of the brake disc.

Figure 2:
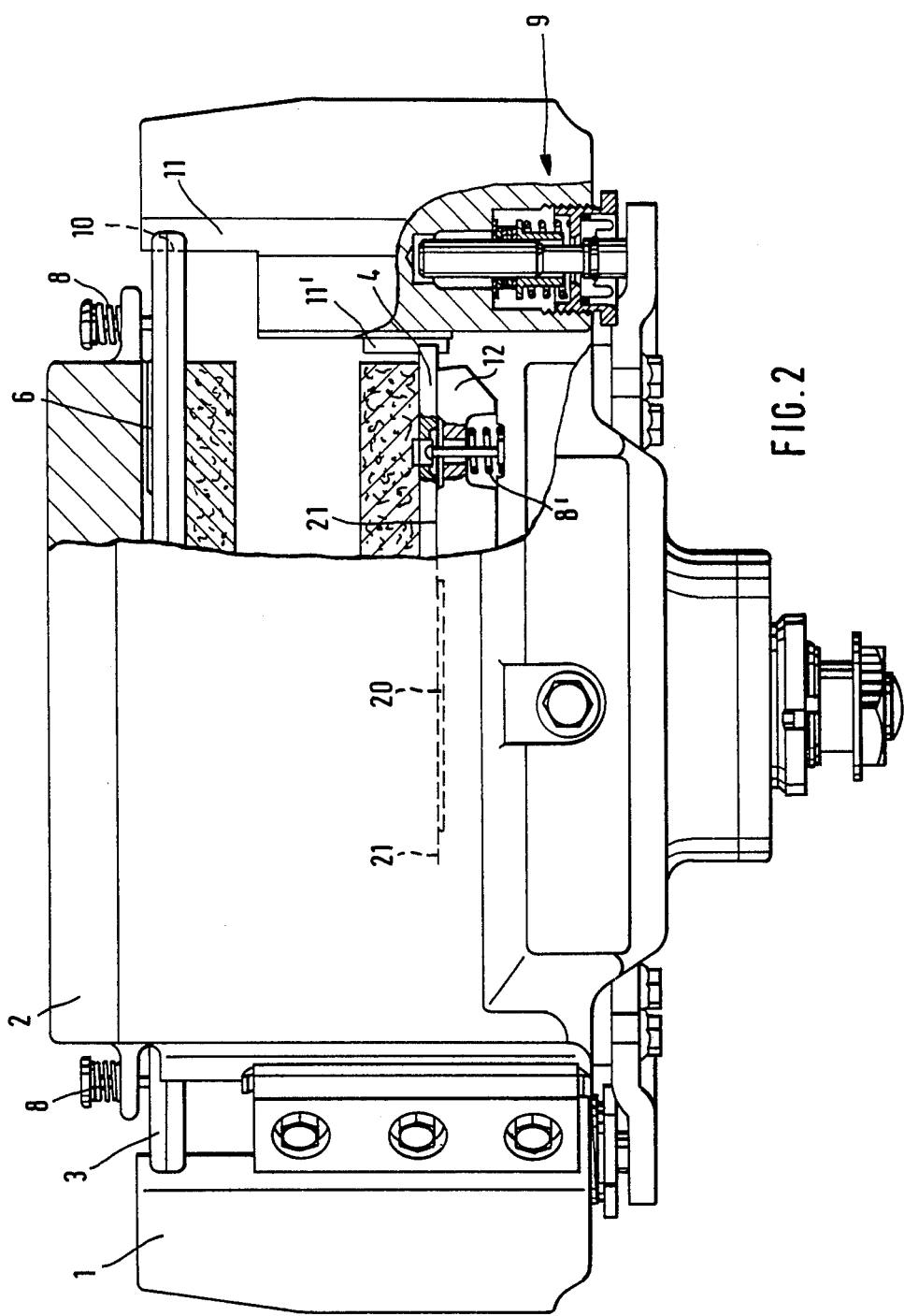
FIG. 2 is a partly cross-sectional top plan view of the sliding saddle disc brake.

The first brake lining carrier 4 on the opposite side of the brake disc is also provided at both its ends with a groove 10', into which respective projections 11' of the brake carrier 1 engage which serve for guidance. The first brake lining carrier 4 is clamped by two helical springs 8' to the pressure plate 12, which abuts it on the formers rear side away from its associated brake lining 4'. A locating boss 13 is arranged between the pressure plate 12 and the piston 14. This boss 13 comprises a cylindrical projection of low height arranged on the end surface of piston 14 and concentrically therewith, which engages into a correspondingly shallow cylindrical recess of the pressure plate 12. The piston 14 further is provided with a concentric threaded bore 19, which is in register with an offset bore 18 of the pressure plate 12, which has an increased diameter towards the first brake lining carrier 4. Screwed in to the bore 19 of piston 14 there is a hexagonal socket-head screw 17 which projects into bore 18 of pressure plate 12. Onto the shaft of hexagonal socket-head screw is pushed a compression spring 16, which is supported at one end by the head of pressure screw 17 and at the other end on a shoulder of bore 18 on the pressure plate 12. As is shown in FIG. 2, the pressure plate 12 has a recess 20 in the middle region of its surface 21 abutting the brake lining carrier 4.

An adjustment mechanism 9 of a kind known per se serves for adjusting the clearance gap, which mechanism is mounted in brake carrier 1 and has a return bolt connected to the first brake saddle shank 2'.

Figure 3:
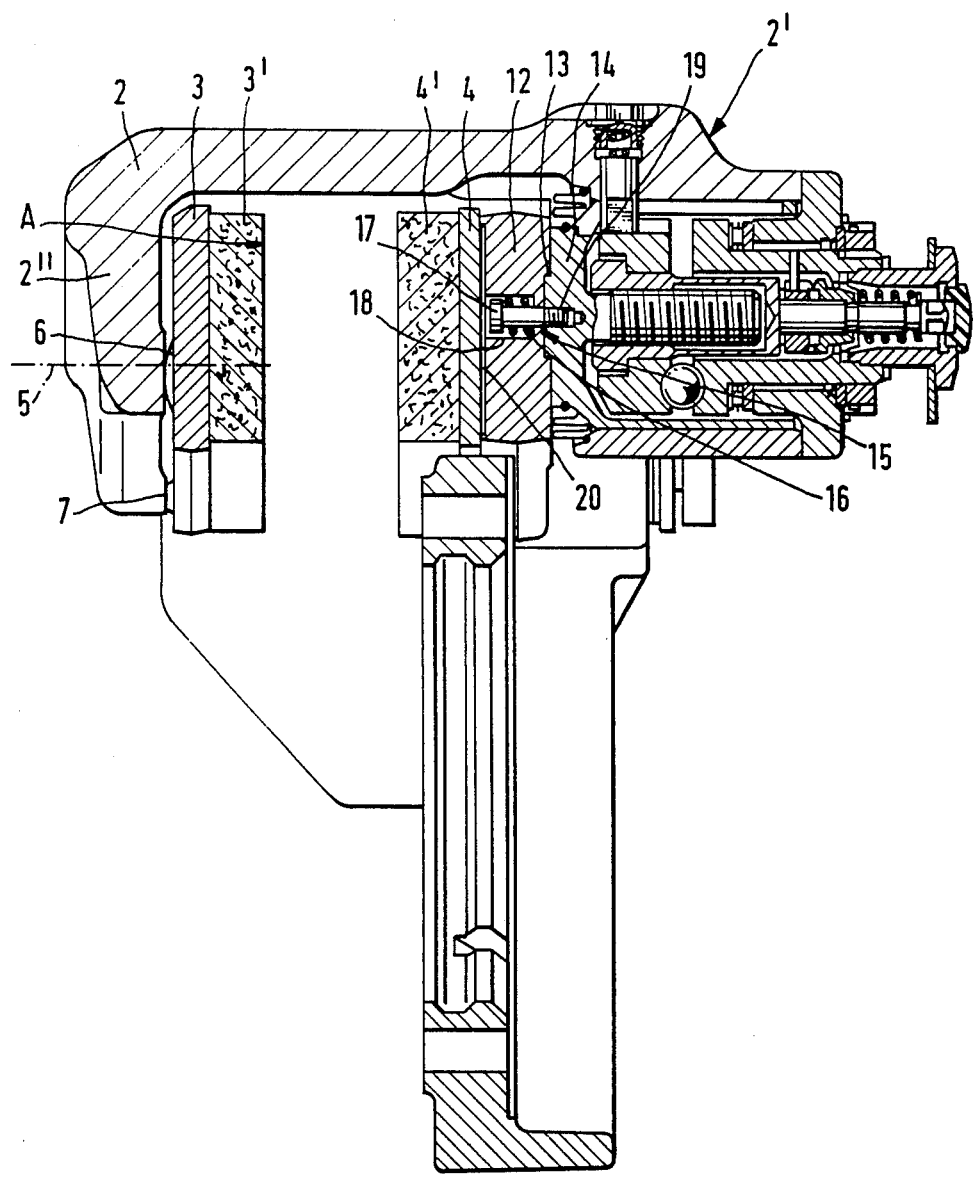
FIG. 3 is an axial cross-sectional view taken along the geometric center line of the sliding saddle disc brake of FIG. 1.

When the expansion mechanism mounted in the first brake saddle shank 2' is operated, then the piston 14 is moved towards the brake disc, that is to the left in FIG. 3, until the brake lining 4' mounted on the first brake lining carrier 4 engages the brake disc. The reaction forces that arise result in the whole brake saddle 2 together with the expansion mechanism being moved relative to the brake carrier 1 to the right according to FIG. 3, until the brake lining 3' mounted on the second brake lining carrier 3 also comes into engagement with the brake disc.

In the case of the second brake lining carrier 3, due to the elastic deformability of the brake saddle 2, a slightly skew positioning of the shank 2' results, which causes uneven wear of the corresponding brake lining 3' considering its surface as a whole. Wear of brake lining 3' is greatest in the upper region shown by arrow A in FIG. 3. This disadvantageous occurrence is prevented however by the provision of the cylindrically curved projections 6, by means of which the lining carrier 3 has the possibility of rocking into exactly planar contact with the brake disc. This rocking movement ensures even wear of the brake lining 3'. As a variation on the illustrated embodiment the cylindrically curved projections 6 could of course be allocated to the second brake saddle shank 2'. In both cases instead of several projection 6 a single continuous projection could be provided.

After termination of a braking operation the second brake lining carrier 3 is brought into abutment with its two abutments 7 by means of two helical springs 8 on the even surface of the second brake saddle shank 2". As the second brake saddle shank 2" after termination of a braking operation returns to its inital position as a result of its own elasticity, this means that the parallel orientation of the second brake lining carrier 3 to the brake disc is again produced.

The wear situation is different for the first brake lining carrier 4 than it is for the second brake lining carrier 3. Here by reason of the situation of the forces acting, comprising the moment of the braking force at the braking surface and the distance to abutment on the pressure plate 12, one sided wear occurs on the running-in side of the brake disc. The relatively short axial length of the boss 13 of pressure plate 12 in piston 14 in combination with the compression spring screw bolt combination 15 however allow slight rocking of pressure plate 12. This rocking movement of pressure plate 12 serves to produce an equivalent moment in the contrary sense and thus to counteract the one sided wear of brake lining 4'. Thereby evasive movement is possible on operation of the brake, so that the first brake lining carrier takes up a position parallel to the brake disc, which ensures approximately even wear of the brake lining 4'. On termination of the braking process helical spring 16 serves to restore the parallel initial position of the first brake lining carrier 4 relative to the brake disc, and the helical springs 8' serve together with the mechanism 9 for the adjustment of the necessary clearance gap.

The recess 20 provided in the middle region of the abutment surface of the pressure plate 12 serves the purpose not only of ensuring that in the lower region of pressure there is even abutment by the two outer abutments 21, of the brake lining 4' allocated to the brake lining carrier 4, but that also in the upper region of pressure in the then occuring through-springing of brake lining carrier 4 instead of two-point contact three-point contact is achieved again causing approximately even wear.

We claim:

1. In a mechanically operated sliding disc brake including a fixedly positioned brake carrier, a brake saddle mounted in the brake carrier and slidably displaceable parallel to the rotational axis of the wheel to be braked and having two shanks which straddle a brake disc which is rotationally fast with the wheel, a piston mounted in the first brake saddle shank slidably displaceable parallel to the rotational axis of the wheel, a pressure plate, a first brake lining carrier positioned on the pressure plate, a first brake lining on the first brake lining carrier engageable with one side of the brake disc, a mechanically operated expansion mechanism supported on the piston and on the first brake saddle shank, a second brake lining carrier positioned on the second brake saddle shank and having a second brake lining engageable with the other side of the brake disc, said second brake saddle shank having a free end, and guides positioned on the brake carrier for guiding and supporting the two brake lining carriers, the improvement comprising:
- a compression spring screw bolt combination for clamping said pressure plate to said piston;
- a boss on said piston engaging said pressure plate for allowing rocking movements of said pressure plate;
- at least one cylindrical projection for supporting said second brake lining carrier on said second brake saddle shank, said at least one cylindrical projection having a crest line running tangentially to said brake disc and through the center of the area of said second brake lining engageable with said other side of said brake disc;
- an abutment for supporting said second brake lining carrier near the free end of said second brake saddle shank; and
- helical springs operatively mounted for clamping said second brake lining carrier to said second brake saddle shank.

2. Sliding saddle disc brake as claimed in claim 1 wherein:
- said at least one cylindrical projection is arranged on said second brake lining carrier; and
- said abutment has flat surfaces engaging said second brake saddle shank.

3. Sliding saddle disc brake as claimed in claim 2 and further comprising:
- a recess in the middle region of the surface of said pressure plate that engages said first brake lining carrier.

4. Sliding saddle disc brake as claimed in claim 2 wherein said compression spring screw bolt combination comprises:
- a bore through said pressure plate;
- a larger diameter counterbore in said pressure plate adjacent said bore;
- a threaded bore in said piston;
- a hexagonal socket-head bolt extending through said bore and in said counterbore and threadedly engaged in said threaded bore; and
- a compression spring supported between the head of said bolt and the inner end of said counterbore.

5. Sliding saddle disc brake as claimed in claim 1 and further comprising:
- a recess in the middle region of the surface of said pressure plate that engages said first brake lining carrier.

6. Sliding saddle disc brake as claimed in claim 5 and further comprising:
- helical springs operatively mounted for clamping said first brake lining carrier to said pressure plate.

7. Sliding saddle disc brake as claimed in claim 6 wherein said compression spring screw bolt combination comprises:
- a bore through said pressure plate;
- a larger diameter counterbore in said pressure plate adjacent said bore;
- a threaded bore in said piston;
- a hexagonal socket-head bolt extending through said bore and in said counterbore and threadedly engaged in said threaded bore; and
- a compression spring supported between the head of said bolt and the inner end of said counterbore.

8. Sliding saddle disc brake as claimed in claim 5 wherein said compression spring screw bolt combination comprises:
- a bore through said pressure plate;
- a larger diameter counterbore in said pressure plate adjacent said bore;
- a threaded bore in said piston;
- a hexagonal socket-head bolt extending through said bore and in said counterbore and threadedly engaged in said threaded bore; and
- a compression spring supported between the head of said bolt and the inner end of said counterbore.

9. Sliding saddle disc brake as claimed in claim 1 wherein said compression spring screw bolt combination comprises:
- a bore through said pressure plate;
- a larger diameter counterbore in said pressure plate adjacent said bore;
- a threaded bore in said piston;
- a hexagonal socket-head bolt extending through said bore and in said counterbore and threadedly engaged in said threaded bore; and
- a compression spring supported between the head of said bolt and the inner end of said counterbore.

* * * * *